No. 857,341. PATENTED JUNE 18, 1907.
S. P. GRACE & R. A. L. SNYDER.
TERMINAL BOX FOR ELECTRIC CABLES.
APPLICATION FILED AUG. 3, 1906.

3 SHEETS—SHEET 3.

Witnesses:

Inventors:
Sergius P. Grace
Richard A. L. Snyder,
By Barton, Brown & Folk
Attys.

UNITED STATES PATENT OFFICE.

SERGIUS P. GRACE AND RICHARD A. L. SNYDER, OF PITTSBURG, PENNSYLVANIA, ASSIGNORS TO WESTERN ELECTRIC COMPANY, OF CHICAGO, ILLINOIS, A CORPORATION OF ILLINOIS.

TERMINAL-BOX FOR ELECTRIC CABLES.

No. 857,341.      Specification of Letters Patent.      Patented June 18, 1907.

Application filed August 3, 1906. Serial No. 329,000.

*To all whom it may concern:*

Be it known that we, SERGIUS P. GRACE and RICHARD A. L. SNYDER, citizens of the United States, residing at Pittsburg, in the county of Allegheny and State of Pennsylvania, have invented a certain new and useful Improvement in Terminal-Boxes for Electric Cables, of which the following is a full, clear, concise, and exact description.

Our invention relates to a terminal box for electric cables, and is designed for use as a means for connecting aerial and cable conductors, as for example in a telephone circuit.

Our invention is more particularly designed for use in the system of distribution known as the "multiple tap system," wherein cable terminals are mounted on certain of the poles carrying a line cable, said terminals being connected by a short piece of cable with the line cable by means of which the cable conductors are made accessible all along the line and the system is made flexible and capable of readily taking care of the subscribers who move about.

In a box terminal it is desirable that the box may be readily opened to give unobstructed and easy access to the terminal posts, and that said terminals shall be thoroughly protected from the weather.

The object of our invention is to meet these requirements in a device which is of simple construction and comparatively inexpensive to manufacture.

In the terminal box of our invention a front chamber and a rear chamber are provided, the former of less width than the latter, separated by a block in which the terminal posts, extending from one chamber to the other, are mounted. The terminals are thus situated in the front of the box and are readily accessible upon opening the cover of the box. The conductors leading out from said posts may be carried out through holes in the rear wall of the outer chamber, the openings for the conductors being thereby so located as to render the terminals least accessible to rain or snow which may beat through said openings.

Figure 1:
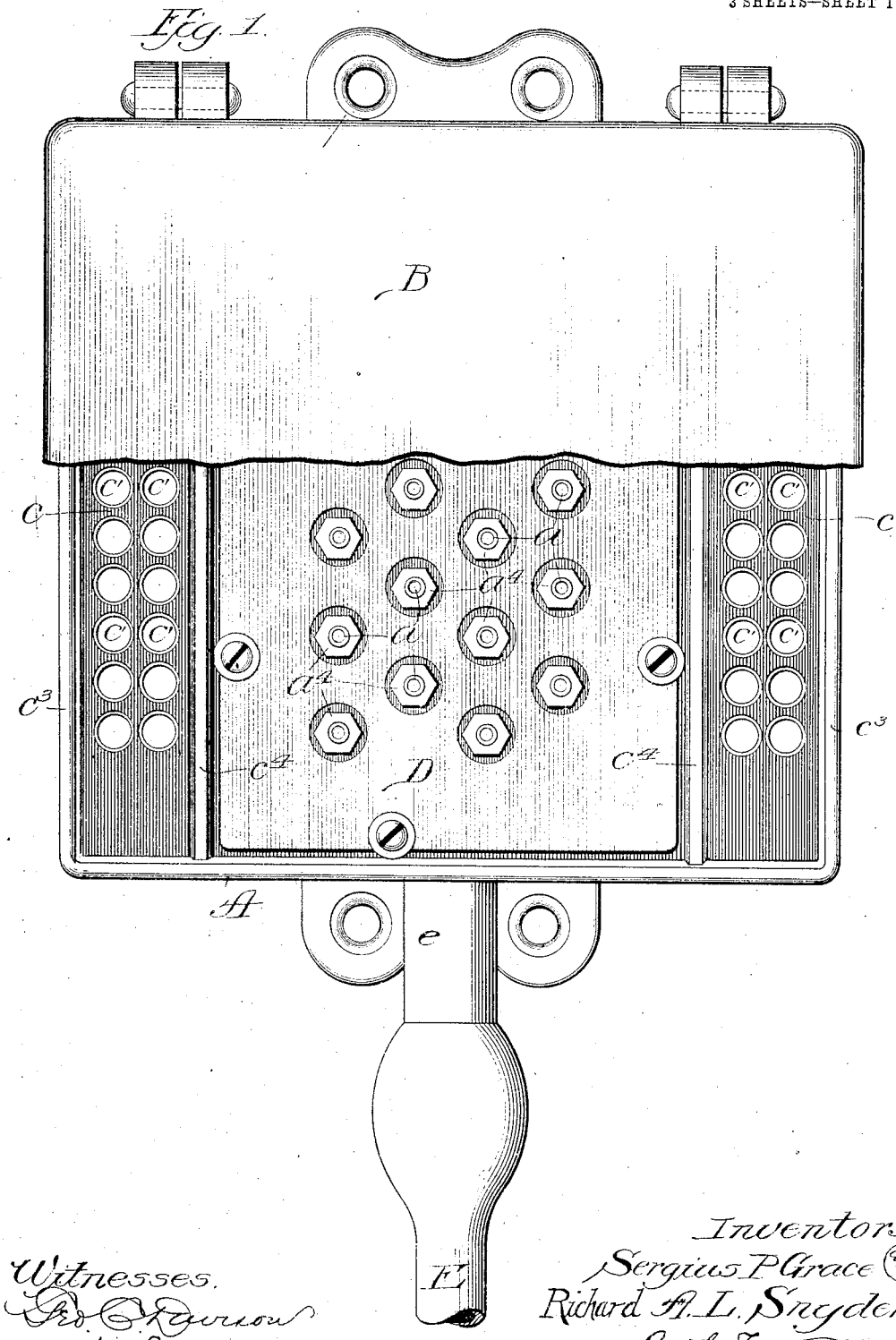
Figure 2:
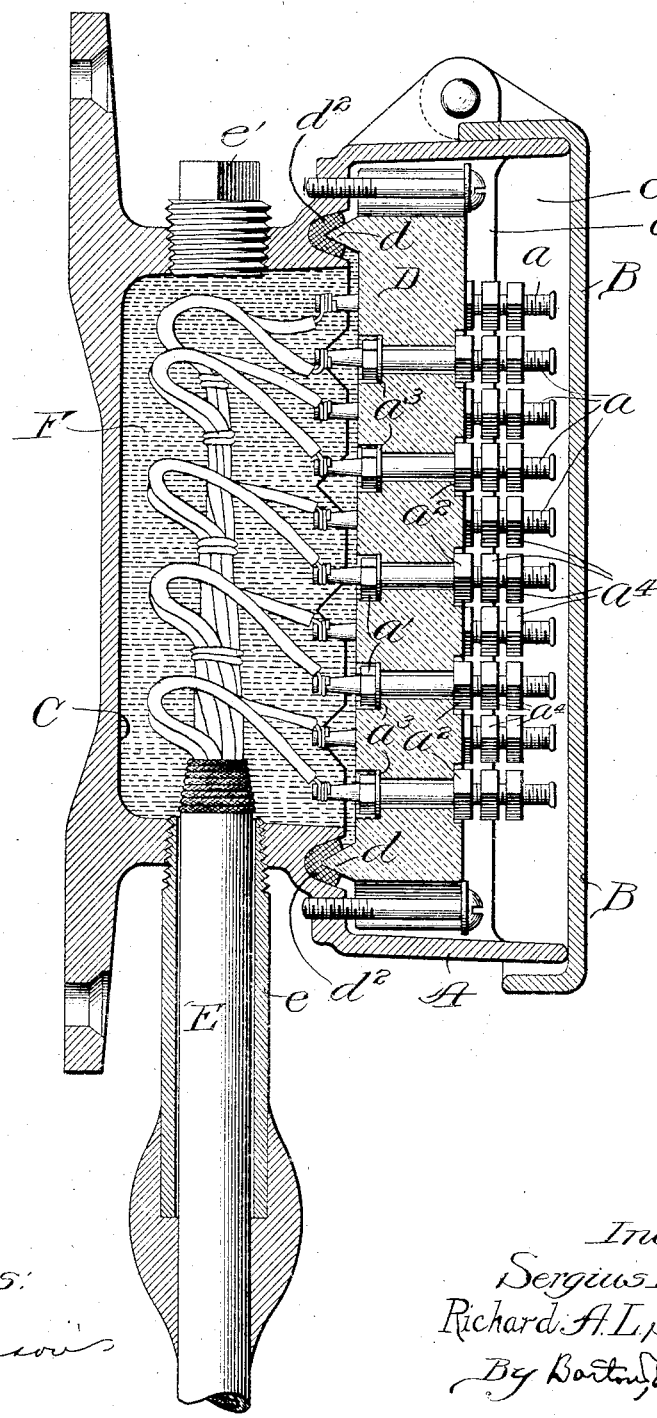
Figure 3:
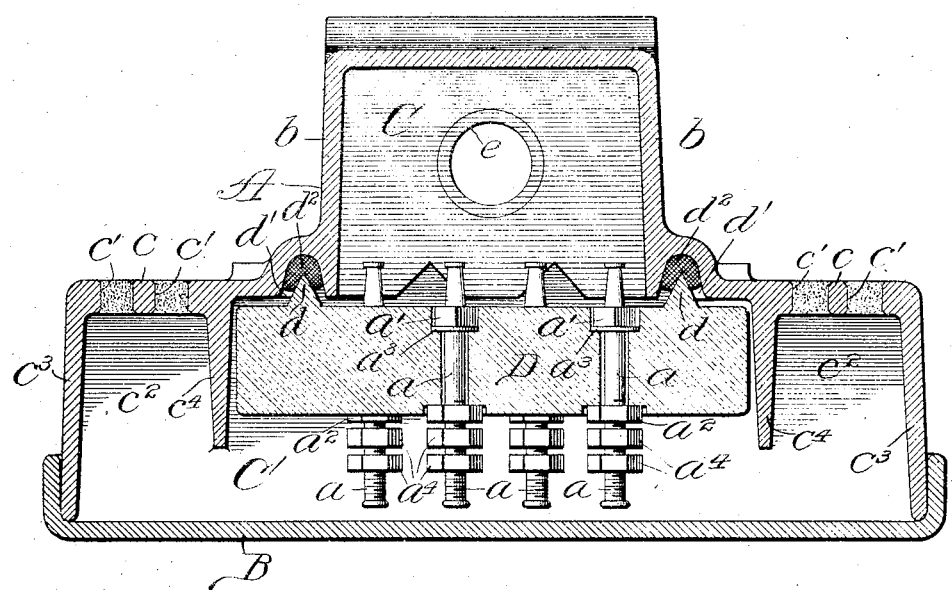
Figure 4:
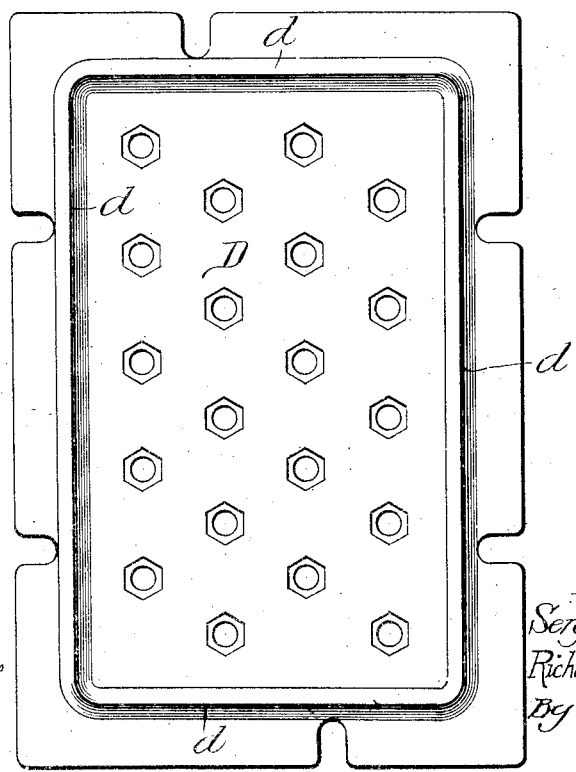

Our invention and the novel features thereof may be more readily understood by reference to the accompanying drawings, in which, Figure 1 is a front elevation of the terminal box, portions of the cover being broken away; Fig. 2 is a vertical section thereof; Fig. 3 is a horizontal cross section; and Fig. 4 is a detailed rear elevation of the mounting block.

Similar letters of reference designate similar parts throughout the different figures.

The box proper consists of a single casting A provided with a hinged cover B. Said box is of unequal depth, thereby providing a rear chamber C of less width than the outer or front chamber C'. A plate D, preferably of porcelain, forms a tight cover for said chamber C, and serves as a mounting block for the terminal posts $a$. The chamber C' lies in front of the chamber C and its rear wall comprises flanges $c\ c$ extending at an angle from the upper edges of the side walls $b\ b$ of the rear chamber. Said flanges are provided with openings $c'\ c'$, through which the wires leading to the terminal posts $a$ enter. For each terminal post there are preferably a plurality of said openings $c'$, in order that each subscriber's drop wires may be brought directly to its pair of terminal posts, thus making each subscriber's wires independent of those of the other subscribers.

In the drawings, two openings $c'$ are shown for each post $a$, but it is obvious that a larger number may be provided where it is deemed desirable. By making the openings $c'$ of approximately the same size as the wires which pass through the same, the passage of water down the wire into the box is practically prevented by a film of water collecting about said opening around the wire and adhering there in such manner as to prevent the further entrance of moisture. If desired the openings $c'$ not in use, as well as those in use may be sealed with putty or by other suitable means to keep out the rain, as shown in Fig. 3. Any water, however, which may be driven by a storm into the box through said openings, will flow down the channels $c^2$, formed between the sidewalls $c^3$, $c^3$, and ribs $c^4$, $c^4$, respectively, and escape at the lower end of the box.

The mounting block D lies between the ribs $c^4$, $c^4$, and is held in place above the chamber C by screws or in any other suitable manner. Said block is provided upon its rear side with a rib $d$ which extends around said block near its edges. Said rib is adapted, when the block is in place, to lie in a groove $d'$, located in the rear wall of the chamber C' and surrounding the chamber C A packing or flexible gasket $d^2$, of cotton wicking or similar material, is provided between said rib and the wall of the groove. Said gasket relieves the block D of stresses to which it might otherwise be subjected, due to contraction or expansion of the iron casting A. We thus make it possible to use a porcelain block instead of the less fragile but poorer insulating material ordinarily used.

Each terminal preferably consists of a stud $a$ provided with an integral hexagonal collar $a'$ adapted to fit in a countersunk opening on the rear of the block D about the hole in the block through which said stud passes, said collar preventing the turning of the stud while the nut $a^2$ is being tightened. A washer $a^3$ of semi-hard rubber lies between said collar and the bottom of the countersunk opening, securely sealing said opening against the admission of moisture. The nuts $a^2$ lie in countersunk openings in the face of the block, thus removing the liability of said nuts to become loosened in unscrewing the nuts $a^4$, $a^4$, in connecting or disconnecting the wires to the terminal posts.

In assembling the parts the usual short cable E is fanned out, each wire being connected to a separate terminal post. The cable end is then drawn down through a pipe $e$ screw-threaded in an opening in the wall of chamber C, the block D being then secured in place as above described. The pipe $e$ is sealed about the cable E in the usual manner, as indicated in Fig. 2. A compound F is then poured in the channel C through an opening normally closed by the plug $e'$. The cover B is secured to the box in any suitable manner, being here shown hinged at the top and opening upwardly. A terminal box is thus provided in which the terminals are readily accessible, and in which the beating in of rain or snow is provided against.

Having described our invention, we claim:

1. A terminal box for electric cables, comprising a casing forming a chamber for receiving the cable ends, a block forming a cover for said chamber, terminal posts mounted in said block, wings extending at an angle from the front of each side of said casing, said wings being provided with openings through which electric conductors may be led to the said terminal posts, and a cover for said wings and terminal block.

2. A terminal box for electric cables, comprising a casing forming a chamber for receiving the cable end, a block forming a cover for said chamber, terminal posts mounted in said block, wings upon each side of said chamber extending at right angles from the front edges of said casing, said wings being provided with openings through which a subscriber's line may extend to said terminals, and a cover for said wings and terminal block.

3. A cable-terminal box having a chamber for receiving the cable ends, said chamber being open at its front, flanges extending outwardly at approximately right angles from the front edges of the walls of said chamber, said flanges being provided with a groove extending around said opening of the chamber, and a plate provided with a rib adapted to fit in said grooves, said plate forming a terminal mounting block and serving as a cover for said rear chamber.

4. A cable-terminal box having a chamber for receiving the cable ends, said chamber being open at its front, flanges extending outwardly at approximately a right angle from the front edges of the walls of said chamber, said flanges being provided with a groove extending around said opening of the chamber, a flexible gasket in said groove, and a plate provided with a rib adapted to enter said groove and rest upon said gasket, said plate being adapted to seal said chamber and to form a terminal mounting block.

5. A cable-terminal box having a rear chamber opening into a front chamber of greater width than said rear chamber, the rear wall of said front chamber being provided with a groove surrounding said opening, and a plate provided with a rib adapted to fit in said groove, said plate being adapted to close said rear chamber and to form a terminal mounting block.

6. A cable-terminal box having a rear chamber opening into a front chamber of greater width than said rear chamber, a plate covering the opening between said chambers, terminal posts mounted in said plate, the rear wall of said front chamber being provided with openings through which conductors may be led to said terminal posts.

7. A cable-terminal box having a rear chamber opening into a front chamber of greater width than said rear chamber, two parallel ribs extending vertically on the rear wall of said front chamber, and a plate resting on said rear wall between said ribs, said plate closing said rear chamber and forming a terminal mounting block.

8. A cable-terminal box having a rear chamber and a front chamber extending upon each side of said rear chamber, said front chamber being provided in its rear wall, on each side of the rear chamber, with a series of holes, and ribs lying between said holes and the opening to the rear chamber, a plate resting on said rear wall between said ribs to close the rear chamber, terminal posts mounted in said plate, and a cover for said front chamber.

In witness whereof, we hereunto subscribe our names this 27th day of July A. D., 1906.

SERGIUS P. GRACE.
RICHARD A. L. SNYDER.

Witnesses:
J. F. McKenna,
E. J. McKenna.